United States Patent
He et al.

(10) Patent No.: US 12,135,552 B2
(45) Date of Patent: Nov. 5, 2024

(54) ROAD FEATURE POINT EXTRACTION METHOD AND SYSTEM

(71) Applicant: GREAT WALL MOTOR COMPANY LIMITED, Hebei (CN)

(72) Inventors: Lin He, Hebei (CN); Longbao Zhen, Hebei (CN); Kai Zhang, Hebei (CN); Junpeng Zhao, Hebei (CN); Wei Li, Hebei (CN); Tianpei Wang, Hebei (CN); Hongliang Liu, Hebei (CN); Ronglin Zeng, Hebei (CN); Weifeng Deng, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 301 days.

(21) Appl. No.: 17/281,558

(22) PCT Filed: Sep. 27, 2019

(86) PCT No.: PCT/CN2019/108401
§ 371 (c)(1),
(2) Date: Mar. 30, 2021

(87) PCT Pub. No.: WO2020/063815
PCT Pub. Date: Apr. 2, 2020

(65) Prior Publication Data
US 2021/0365027 A1    Nov. 25, 2021

(30) Foreign Application Priority Data
Sep. 30, 2018  (CN) .......................... 201811153737.1

(51) Int. Cl.
*G05D 1/02*     (2020.01)
*G01C 21/30*   (2006.01)
(Continued)

(52) U.S. Cl.
CPC ........... *G05D 1/0212* (2013.01); *G01C 21/30* (2013.01); *G05D 1/0274* (2013.01); *G06V 20/588* (2022.01)

(58) Field of Classification Search
CPC .. G05D 1/0212; G05D 1/0274; G06V 20/588; G01C 21/30
See application file for complete search history.

(56) References Cited

U.S. PATENT DOCUMENTS

| 8,467,962 B2 | 6/2013 | Irie et al. |
| 2007/0021907 A1 | 1/2007 | Kato et al. |

(Continued)

FOREIGN PATENT DOCUMENTS

| CN | 101636636 A | 1/2010 |
| CN | 102313554 A | 1/2012 |

(Continued)

OTHER PUBLICATIONS

Machine Translation of JP2008008860 (Year: 2008).*
English Translation of International Search Report and Written Opinion from PCT/CN2019/108401 dated Dec. 27, 2019 (2 pages).

*Primary Examiner* — Sahar Motazedi
(74) *Attorney, Agent, or Firm* — Calfee, Halter & Griswold LLP

(57) ABSTRACT

Disclosed are a road feature point extraction method and system. The road feature point extraction method comprises: acquiring map information for the current position of a vehicle, wherein the map information comprises the attributes of the current road and the attributes of the next road section; comparing the attributes of the current road with the attributes of the next road section to determine the road type of the next road section; and extracting, in conjunction with the road type of the next road section and the map information corresponding to the next road section, a road feature point representing a road scene on the next road section, and (Continued)

outputting the name of the extracted road feature point and information of the relative distance between the road feature point and the vehicle.

9 Claims, 5 Drawing Sheets

(51) Int. Cl.
*G05D 1/00* (2006.01)
*G06K 9/00* (2022.01)
*G06V 20/56* (2022.01)

(56) References Cited

U.S. PATENT DOCUMENTS

| | | |
|---|---|---|
| 2010/0017117 A1 | 1/2010 | Irie et al. |
| 2010/0145604 A1 | 6/2010 | Hiyokawa |
| 2010/0288540 A1 | 11/2010 | Honjo et al. |
| 2012/0029800 A1 | 2/2012 | Kluge et al. |
| 2015/0160034 A1* | 6/2015 | Kim ................... G01C 21/3658 701/410 |
| 2016/0327399 A1* | 11/2016 | Ronnang ................ B60K 35/00 |
| 2020/0284610 A1* | 9/2020 | Hatayama .......... G01C 21/3658 |

FOREIGN PATENT DOCUMENTS

| | | |
|---|---|---|
| CN | 102542811 A | 7/2012 |
| CN | 102735256 A | 10/2012 |
| CN | 104819724 A | 8/2015 |
| CN | 105206068 A | 12/2015 |
| CN | 105701204 A | 6/2016 |
| CN | 106289303 A | 1/2017 |
| CN | 106323305 A | 1/2017 |
| CN | 110361015 A | 10/2019 |
| EP | 2065679 A1 | 6/2009 |
| JP | 2008-8860 A | 1/2008 |
| JP | 2008281523 A | 11/2008 |
| JP | 2011043518 A | 3/2011 |
| JP | 2018025490 A | 2/2018 |

* cited by examiner ial Stage of International
ROAD FEATURE POINT EXTRACTION METHOD AND SYSTEM

CROSS-REFERENCE TO RELATED APPLICATIONS

This application is the National Stage of International Application No. PCT/CN2019/108401, filed on Sep. 27, 2019, which claims priority to Chinese Patent Application No. 201811153737.1, filed on Sep. 30, 2018, which are incorporated herein by reference in their entireties.

FIELD OF THE INVENTION

The present invention relates to the field of intelligent transportation, in particular to a road feature point extraction method and system.

BACKGROUND OF THE INVENTION

At present, vehicles with an Autonomous Driving System (ADS) are gradually brought to the market, which greatly promotes the development of intelligent transportation. The ADS collects data of a road around a vehicle and data of a target (for example, other vehicles ahead) in real time by using various sensing devices installed on the vehicle, identifies static characteristics and dynamic characteristics of the target, and determines a position of the target on the road, so that an automatic driving computer can determine a potential danger in the shortest time, and performs lateral and longitudinal control on the vehicle to prevent the danger from occurring.

When the vehicle is subject to lateral and longitudinal control on an expressway, it is necessary to know a change in a road ahead and a position of the vehicle to perform lateral and longitudinal control to adjust acceleration, deceleration, or directional control of the vehicle. Therefore, during the traveling of the vehicle, it is necessary to continuously extract and provide map information to the automatic driving computer so that it can grasp the road information ahead. In the prior art, the automatic driving vehicle acquires general road information in the vicinity of the current position of the vehicle from the map information. However, since the information extracted based on the map information is various and is not targeted, there is a high possibility that useless information is extracted or really necessary information is not extracted (for example, information on a start point and an end point of an acceleration lane is not extracted but information on a certain point in the middle of the acceleration lane is extracted), and thus it is impossible to accurately control the vehicle to perform operations such as acceleration, deceleration and lane changing.

Therefore, in order to achieve accurate control of the vehicle, information that a specific action is performed at a specific position must be provided to the vehicle, for example, the vehicle will pass through an acceleration lane when entering a high-speed main road from a ramp, and at this time, the start and end points of the acceleration lane must be quickly and accurately provided to the vehicle to accurately represent a road scene of the vehicle entering the acceleration lane.

SUMMARY OF THE INVENTION

In view of this, the present invention aims to provide a road feature point extraction method to at least partially solve the above-mentioned technical problems.

To achieve the above-mentioned object, the technical solution of the present invention is implemented as follows:

A road feature point extraction method may comprises: acquiring map information for a current position of a vehicle, wherein the map information comprises current road attributes and next road attributes; comparing the current road attributes with the next road attributes to determine a road type of the next road; and extracting a road feature point representing a road scene on the next road by combining the road type of the next road and the map information corresponding to the next road, and outputting a name of the extracted road feature point and relative distance information between the road feature point and the vehicle.

Furthermore, the method may further comprises: acquiring navigation information for the current position of the vehicle; and triggering execution of comparing the current road attributes with the next road attributes by means of forward road conditions prompted by the navigation information before comparing the current road attributes with the next road attributes to determine a road type of a next road.

Furthermore, the outputting a name of the extracted road feature point comprises: determining and outputting the name of the extracted road feature point by combining the navigation information.

Furthermore, the current road attributes and the next road attributes comprise respective corresponding exchange area attribute, lane line attribute and/or tunnel attribute, wherein the exchange area attribute is information indicating whether there is a change in the number of lanes on the road, the lane line attribute is information indicating the number of lane lines of the road, and the tunnel attribute is information indicating whether there is a tunnel in the road.

Furthermore, the comparing the current road attributes with the next road attributes to determine a road type of a next road comprises any one of: determining that the next road comprises an acceleration lane when the exchange area attribute of the current road is none, and the exchange area attribute of the next road is a lane exit or entrance; determining that the next road comprises a deceleration lane when the exchange area attribute of the current road is none, and the exchange area attribute of the next road is an off-ramp; determining that the next road comprises a main road widening lane when the lane number attribute of the current road is less than the lane number attribute of the next road, and the exchange area attribute of the next road is a main road lane increase; determining that the next road comprises a main road narrowing lane when the lane number attribute of the current road is more than the lane number attribute of the next road, and the exchange area attribute of the next road is a main road lane decrease; determining that the next road comprises a main road bifurcation lane when the exchange area attribute of the current road is none, and the exchange area attribute of the next road is a main road lane joining entrance or exit; determining that the next road comprises a ramp bifurcation lane when the exchange area attribute of the current road is none, and the exchange area attribute of the next road is a ramp lane joining entrance or exit; determining that the next road comprises a ramp widening lane when the lane number attribute of the current road is less than the lane number attribute of the next road, and the exchange area attribute of the next road is a ramp lane increase; determining that the next road comprises a ramp narrowing lane when the lane number attribute of the current road is more than the lane number attribute of the next road, and the exchange area attribute of the next road is a ramp lane decrease; determining that the next road comprises a ramp merging lane or a ramp joining lane when the exchange area attribute of the current road is none, and the exchange area attribute of the next road is a lane joining entrance or exit; and determining that the next road comprises a road tunnel when the tunnel attribute of the current road is none, and the tunnel attribute of the next road is present.

Furthermore, the extracting a road feature point on the next road, and outputting a name of the extracted road feature point and relative distance information between the road feature point and the vehicle comprises: extracting a corresponding lane feature point when it is determined that the next road comprises any one of an acceleration lane, a deceleration lane, a main road widening lane, a main road narrowing lane, a main road bifurcation lane, a ramp bifurcation lane, a ramp widening lane, a ramp narrowing lane, a ramp merging lane, a ramp joining lane and a tunnel, and outputting a lane start point and a lane end point corresponding to the lane feature point, and a relative position from the lane start point and the lane end point to the vehicle.

Compared with the prior art, the road feature point extraction method according to the present invention has the following advantages:

(1) The road feature point extraction method according to the present invention does not need to acquire general road information in the vicinity of the current position of the vehicle separately, but determines the road feature point capable of precisely representing the road scene through map information, and extracts the name and position information of the important road feature point related to vehicle control, thereby reducing the data analysis amount for vehicle control and being more targeted, and being capable of extracting the information really needed for vehicle control, and being capable of controlling the vehicle precisely to achieve operations such as acceleration, deceleration and lane changing.

(2) The application of navigation information and map information form redundancy and coordination, which can better ensure the accuracy of extracting a road feature point.

Another object of the present invention is to provide a road feature point extraction system to at least partially solve the above-mentioned technical problems.

To achieve the above-mentioned object, the technical solution of the present invention is implemented as follows:

A road feature point extraction system comprises: a map system, installed on a vehicle and used for acquiring map information for a current position of the vehicle, wherein the map information comprises current road attributes and next road attributes; and a feature point extraction unit, electrically connected to the map system and used for comparing the current road attributes with the next road attributes to determine a road type of a next road, and extracting a road feature point representing a road scene on the next road by combining the road type of the next road and the map information corresponding to the next road, and outputting a name of the extracted road feature point and relative distance information between the road feature point and the vehicle.

Furthermore, the system may further comprises: a navigation system, installed on the vehicle and used for acquiring navigation information for the current position of the vehicle, wherein the feature point extraction unit is further electrically connected to the navigation system, and used for triggering execution of comparing the current road attributes with the next road attributes by means of forward road conditions prompted by the navigation information.

Furthermore, the feature point extraction unit is further used for determining the name of the extracted road feature point by combining the navigation information.

Furthermore, the current road attributes and the next road attributes comprise respective corresponding exchange area attribute, lane line attribute and/or tunnel attribute, wherein the exchange area attribute is information indicating whether there is a change in the number of lanes on the road, the lane line attribute is information indicating the number of lane lines of the road, and the tunnel attribute is information indicating whether there is a tunnel in the road.

Furthermore the feature point extraction unit comparing the current road attributes with the next road attributes to determine a road type of a next road comprises any one of: determining that the next road comprises an acceleration lane when the exchange area attribute of the current road is none, and the exchange area attribute of the next road is a lane exit or entrance; determining that the next road comprises a deceleration lane when the exchange area attribute of the current road is none, and the exchange area attribute of the next road is an off-ramp; determining that the next road comprises a main road widening lane when the lane number attribute of the current road is less than the lane number attribute of the next road, and the exchange area attribute of the next road is a main road lane increase; determining that the next road comprises a main road narrowing lane when the lane number attribute of the current road is more than the lane number attribute of the next road, and the exchange area attribute of the next road is a main road lane decrease; determining that the next road comprises a main road bifurcation lane when the exchange area attribute of the current road is none, and the exchange area attribute of the next road is a main road lane joining entrance or exit; determining that the next road comprises a ramp bifurcation lane when the exchange area attribute of the current road is none, and the exchange area attribute of the next road is a ramp lane joining entrance or exit; determining that the next road comprises a ramp widening lane when the lane number attribute of the current road is less than the lane number attribute of the next road, and the exchange area attribute of the next road is a ramp lane increase; determining that the next road comprises a ramp narrowing lane when the lane number attribute of the current road is more than the lane number attribute of the next road, and the exchange area attribute of the next road is a ramp lane decrease; determining that the next road comprises a ramp merging lane or a ramp joining lane when the exchange area attribute of the current road is none, and the exchange area attribute of the next road is a lane joining entrance or exit; and determining that the next road comprises a road tunnel when the tunnel attribute of the current road is none, and the tunnel attribute of the next road is present.

Furthermore, the feature point extraction unit extracting a road feature point on the next road, and outputting a name of the extracted road feature point and relative distance information between the road feature point and the vehicle comprises: extracting a corresponding lane feature point when it is determined that the next road comprises any one of an acceleration lane, a deceleration lane, a main road widening lane, a main road narrowing lane, a main road bifurcation lane, a ramp bifurcation lane, a ramp widening lane, a ramp narrowing lane, a ramp merging lane, a ramp joining lane and a tunnel, and outputting a lane start point and a lane end point corresponding to the lane feature point, and a relative position from the lane start point and the lane end point to the vehicle.

The road feature point extraction system has the same advantages as the above-mentioned road feature point extraction method over the prior art, and details are not described here.

Another object of the present invention is to provide a machine-readable storage medium, wherein an instruction is stored on the machine-readable storage medium, and the instruction is used for causing a controller to execute the above-mentioned road feature point extraction method.

Other features and advantages of the present invention will be described in detail in the specific embodiments below.

BRIEF DESCRIPTION OF DRAWINGS

The drawings, which form a part of the present invention, are used to provide a further understanding of the present invention. The exemplary embodiments of the present invention and the description thereof are used to explain the present invention, and do not constitute an improper limitation on the present invention. In the drawings.

BRIEF DESCRIPTION OF REFERENCE SIGNS

1. Map system; 2. Feature point extraction unit; 3. Navigation system.

DETAILED DESCRIPTION OF THE EMBODIMENTS

It should be noted that, in the case of no conflict, the embodiments of the present invention and features in the embodiments can be combined with each other.

In the embodiments of the present invention, "electrical connection" is used to describe the signal connection between two components, such as a control signal and a feedback signal, and an electrical power connection between two components. In addition, the "connection" involved in the embodiments of the present invention can be a wired connection or a wireless connection, and the "electrical connection" involved can be a direct electrical connection between two components or an indirect electrical connection through another component.

The present invention will be described in detail below with reference to the drawings and embodiments.

Figure 1:
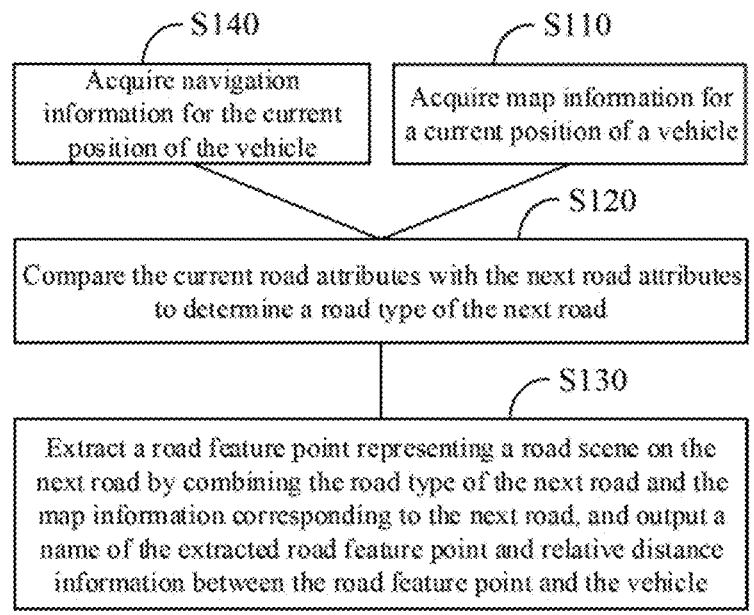
FIG. 1 is a schematic flowchart of a road feature point extraction method according to an embodiment of the present invention.

FIG. 1 is a schematic flowchart of a road feature point extraction method according to an embodiment of the present invention, wherein the road feature points are points that may represent a road scene and are located at a specific position on the road, such as the start and end points of an acceleration lane, which can represent the scene where a vehicle enters the acceleration lane.

As shown in FIG. 1, the road feature point extraction method can comprise the following steps:

Step S110, acquiring map information for a current position of a vehicle, wherein the map information comprises current road attributes and next road attributes;

Wherein, the current road attributes and the next road attributes comprise respective corresponding exchange area attribute, lane line attribute and/or tunnel attribute, wherein the exchange area attribute is information indicating whether there is a change in the number of lanes on the road, the lane line attribute is information indicating the number of lane lines of the road, and the tunnel attribute is information indicating whether there is a tunnel in the road. The application of these attributes will be introduced below, and details are not described here.

In addition, the map information is preferably high-precision map information, and those skilled in the art know that the map information can show the location of the road, the length of the road, the distance from the vehicle to the target, and the like. The high-precision map divides the road into a set of map points section by section, and the map output will divide the road from the position where the road changes, and will also give the relevant attributes of the current road and the next road.

Step S120, comparing the current road attributes with the next road attributes to determine a road type of a next road.

Step S130, extracting a road feature point representing a road scene on the next road by combining the road type of the next road and the map information corresponding to the next road, and outputting a name of the extracted road feature point and relative distance information between the road feature point and the vehicle.

In a preferred embodiment, the road feature point extraction method can further comprise:

Step S140: acquiring navigation information for the current position of the vehicle.

In the case that step S140 exists, in step S120, execution of comparing the current road attributes with the next road attributes can be triggered by means of forward road conditions prompted by the navigation information. In combination with step S130, that is, the navigation information can be used as a trigger condition for whether to start road feature point extraction.

Steps S110-S140 will be comprehensively described through an example below. In the example, the map information being a high-precision map is taken as an example, and the following ten road types can be determined and the corresponding ten road feature points can be extracted:

I. Acceleration Lane Feature Points.

Through step S120, when the exchange area attribute of the current road is none, and the exchange area attribute of the next road is a lane exit or entrance, it is determined that the next road comprises an acceleration lane. The exchange area attribute is none, meaning that there is no change in the number of lanes; and the exchange area attribute of the next road is a lane exit or entrance, indicating that there is a change in the number of lanes.

In this scene, there can be no trigger condition for the extraction of the acceleration lane feature points (that is, not prompted by the navigation information), but the acceleration road feature points can be obtained through comprehensive judgment of the current road attributes and the next road attributes.

Then through step S130, when it is determined that the next road comprises an acceleration lane, acceleration lane feature points are extracted, and an acceleration lane start point and an acceleration lane end point which belong to the acceleration lane feature points, and a relative position from the acceleration lane start point and the acceleration lane end point to the vehicle are output. Specifically, the start point and the length of the next road can be extracted from the map information, so that the end point can be further determined, and the distances between the vehicle and the start point and the end point of the next road can be calculated.

Figure 2:
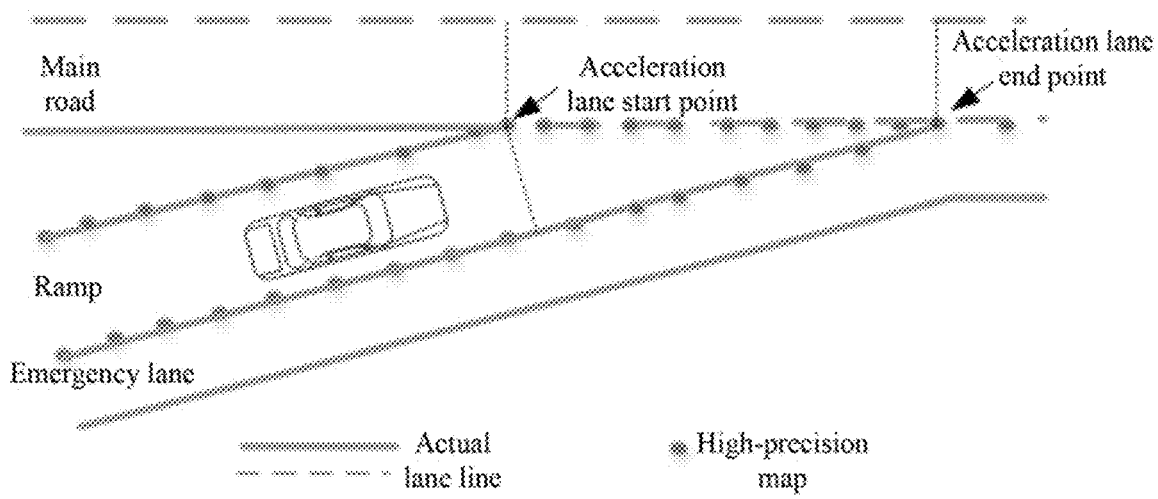
FIG. 2 is a schematic diagram of extracting acceleration lane feature points according to an embodiment of the present invention.

FIG. 2 is a schematic diagram of extracting acceleration lane feature points according to an embodiment of the present invention. It can be seen that the acceleration lane start point, the acceleration lane end point and position information of the two points can be finally output to accurately represent the current road scene. Therefore, compared with the scheme of extracting other points on the acceleration lane for automatic driving control, more accurate position information of the feature points is extracted, and precise control of the vehicle can be realized.

In addition, the relative position of the road feature points from the vehicle involved in the embodiment of the present invention can be relative position information determined based on a driving coordinate system, wherein the driving coordinate system takes a road boundary line on one side of the road on which the vehicle is located as a reference line, takes a road guide line direction as an $X_F$ axis, and takes a direction following a left-hand rule with the road guide line direction as a $Y_F$ axis, so that the trend of lane lines can be better reflected. Compared with the vehicle coordinate system, the relative position information based on the driving coordinate system can also reflect the distance that the actual vehicle needs to drive along the lane line, rather than the Euclidean distance between two points.

II. Deceleration Lane Feature Points.

Through step S120, when the exchange area attribute of the current road is none, and the exchange area attribute of the next road is an off-ramp, it is determined that the next road comprises a deceleration lane.

Then through step S130, when it is determined that the next road comprises a deceleration lane, deceleration lane feature points are extracted, and a deceleration lane start point and a deceleration lane end point which belong to the deceleration lane feature points, and a relative position from the deceleration lane start point and the deceleration lane end point to the vehicle are output.

In this scene, the navigation information prompting the off-ramp (at this time about 2 km from the ramp exit) can be used as a trigger condition for extracting deceleration lane feature points, and then the deceleration lane feature points are extracted through step S120 and step S130. Here, the navigation information is used as a factor of the trigger condition of the road feature points, so that it can be matched with the map information to more trigger the timely extraction of road feature points and ensure the importance of the extracted feature points.

Figure 3:
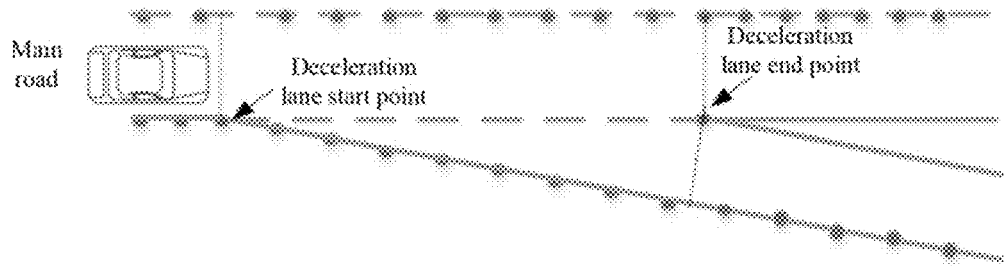
FIG. 3 is a schematic diagram of extracting deceleration lane feature points according to an embodiment of the present invention.

FIG. 3 is a schematic diagram of extracting deceleration lane feature points according to an embodiment of the present invention. It can be seen that the deceleration lane start point, the deceleration lane end point and position information of the two points can be finally output to accurately represent the current road scene and realize precise control of the vehicle.

In an embodiment of the present invention, outputting a name of the extracted road feature point can comprise: determining and outputting the name of the extracted road feature point by combining the navigation information. Here, for example, the navigation information will prompt "Enter a deceleration lane ahead", the keyword "deceleration lane" in the navigation information can be extracted in the embodiment of the present invention, and the extracted road feature points are named as the deceleration lane start point and the deceleration lane end point.

III. Main Road Widening Feature Points

Through step S120, when the lane number attribute of the current road is less than the lane number attribute of the next road, and the exchange area attribute of the next road is a main road lane increase, it is determined that the next road comprises a main road widening lane.

Then through step S130, when it is determined that the next road comprises a main road widening lane, main road widening feature points are extracted, and a main road widening start point and a main road widening end point which belong to the main road widening feature points, and a relative position from the main road widening start point and the main road widening end point to the vehicle are output.

Further, the navigation information prompting the road widening (at this time about 2 km from the ramp exit) can be used as a trigger condition for extracting main road widening feature points, and then the main road widening feature points are extracted through step S120 and step S130.

Figure 4:
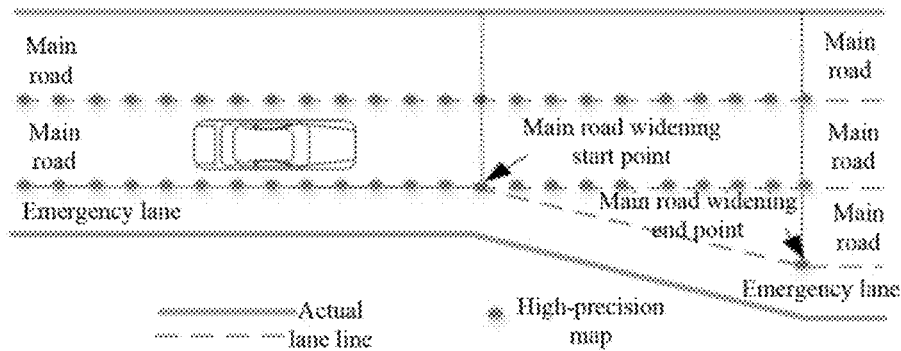
FIG. 4 is a schematic diagram of extracting main road widening feature points according to an embodiment of the present invention.

FIG. 4 is a schematic diagram of extracting main road widening feature points according to an embodiment of the present invention. It can be seen that the main road widening start point, the main road widening end point and position information of the two points can be finally output to accurately represent the current road scene and realize precise control of the vehicle.

IV. Main Road Narrowing Feature Points.

Through step S120, when the lane number attribute of the current road is more than the lane number attribute of the next road, and the exchange area attribute of the next road is a main road lane decrease, it is determined that the next road comprises a main road narrowing lane.

Then through step S130, when it is determined that the next road comprises a main road narrowing lane, main road narrowing feature points are extracted, and a main road narrowing start point and a main road narrowing end point which belong to the main road narrowing feature points, and a relative position from the main road narrowing start point and the main road narrowing end point to the vehicle are output.

Further, the navigation information prompting the road narrowing (at this time about 2 km from the ramp exit) can be used as a trigger condition for extracting main road narrowing feature points, and then the main road narrowing feature points are extracted through step S120 and step S130.

Figure 5:
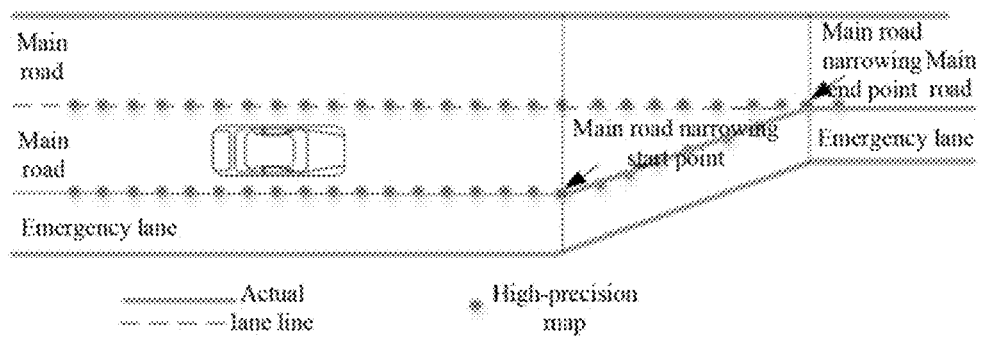
FIG. 5 is a schematic diagram of extracting main road narrowing feature points according to an embodiment of the present invention.

FIG. 5 is a schematic diagram of extracting main road narrowing feature points according to an embodiment of the present invention. It can be seen that the main road narrowing start point, the main road narrowing end point and position information of the two points can be finally output to accurately represent the current road scene and realize precise control of the vehicle.

V. Main Road Bifurcation Feature Points (Separated Roadbed)

Through step S120, when the exchange area attribute of the current road is none, and the exchange area attribute of the next road is a main road lane joining entrance or exit, it is determined that the next road comprises a main road bifurcation lane.

Then through step S130, when it is determined that the next road comprises a main road bifurcation lane, main road bifurcation feature points are extracted, and a main road bifurcation start point and a main road bifurcation end point which belong to the main road bifurcation feature points, and a relative position from the main road bifurcation start point and the main road bifurcation end point to the vehicle are output.

Further, the navigation information prompting the main road bifurcation (at this time about 2 km from the ramp exit) can be used as a trigger condition for extracting main road bifurcation feature points, and then the main road bifurcation feature points are extracted through step S120 and step S130.

Figure 6:
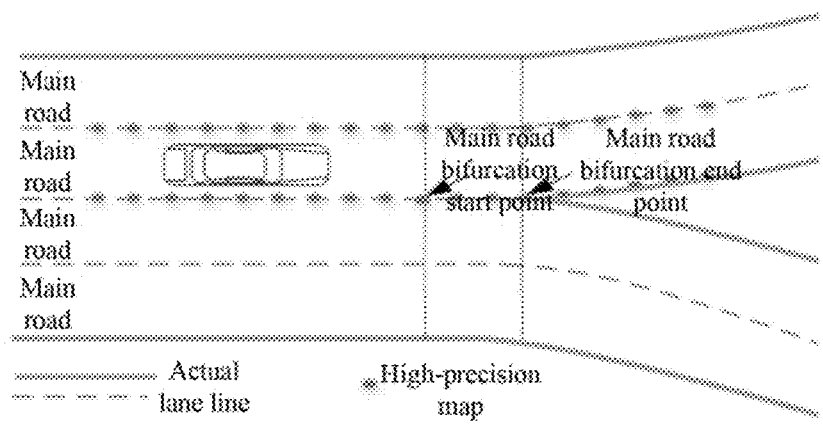
FIG. 6 is a schematic diagram of extracting main road bifurcation feature points according to an embodiment of the present invention.

FIG. 6 is a schematic diagram of extracting main road bifurcation feature points according to an embodiment of the present invention. It can be seen that the main road bifurcation start point, the main road bifurcation end point and position information of the two points can be finally output to accurately represent the current road scene and realize precise control of the vehicle.

VI. Ramp Bifurcation Feature Points.

Through step S120, when the exchange area attribute of the current road is none, and the exchange area attribute of the next road is a ramp lane joining entrance or exit, it is determined that the next road comprises a ramp bifurcation lane.

Then through step S130, when it is determined that the next road comprises a ramp bifurcation lane, ramp bifurcation feature points are extracted, and a ramp bifurcation start point and a ramp bifurcation end point which belong to the ramp bifurcation feature points, and a relative position from the ramp bifurcation start point and the ramp bifurcation end point to the vehicle are output.

Furthermore, the navigation information prompting the ramp bifurcation (at this time about 2 km from the ramp exit) can be used as a trigger condition for extracting ramp bifurcation feature points, and then the ramp bifurcation feature points are extracted through step S120 and step S130.

Figure 7:
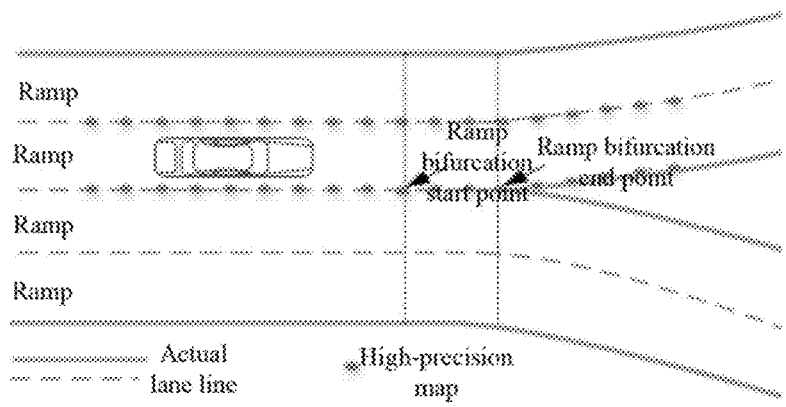
FIG. 7 is a schematic diagram of extracting ramp bifurcation feature points according to an embodiment of the present invention.

FIG. 7 is a schematic diagram of extracting ramp bifurcation feature points according to an embodiment of the present invention. It can be seen that the ramp bifurcation start point, the ramp bifurcation end point and position information of the two points can be finally output to accurately represent the current road scene and realize precise control of the vehicle.

VII. Ramp Widening Feature Points.

Through step S120, when the lane number attribute of the current road is less than the lane number attribute of the next road, and the exchange area attribute of the next road is a ramp lane increase, it is determined that the next road comprises a ramp widening lane.

Then through step S130, when it is determined that the next road comprises a ramp widening lane, ramp widening feature points are extracted, and a ramp widening start point and a ramp widening end point which belong to the ramp widening feature points, and a relative position from the ramp widening start point and the ramp widening end point to the vehicle are output.

Further, there can be no trigger condition for extracting the ramp widening feature points, but the road type is comprehensively determined directly through step S120, and then the ramp widening feature points are extracted through step S130.

Figure 8:
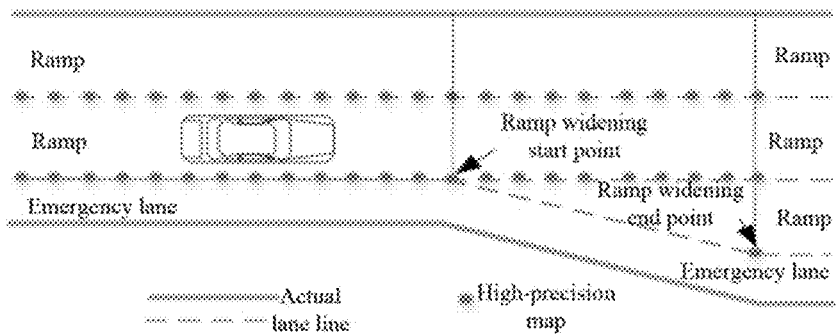
FIG. 8 is a schematic diagram of extracting ramp widening feature points according to an embodiment of the present invention.

FIG. 8 is a schematic diagram of extracting ramp widening feature points according to an embodiment of the present invention. It can be seen that the ramp widening start point, the ramp widening end point and position information of the two points can be finally output to accurately represent the current road scene and realize precise control of the vehicle.

VIII. Ramp Narrowing Feature Points.

Through step S120, when the lane number attribute of the current road is more than the lane number attribute of the next road, and the exchange area attribute of the next road is a ramp lane decrease, it is determined that the next road comprises a ramp narrowing lane.

Then through step S130, when it is determined that the next road comprises a ramp narrowing lane, ramp narrowing feature points are extracted, and a ramp narrowing start point and a ramp narrowing end point which belong to the ramp narrowing feature points, and a relative position from the ramp narrowing start point and the ramp narrowing end point to the vehicle are output.

Furthermore, there can be no trigger condition for extracting the ramp narrowing feature points, but the road type is comprehensively determined directly through step S120, and then the ramp narrowing feature points are extracted through step S130.

Figure 9:
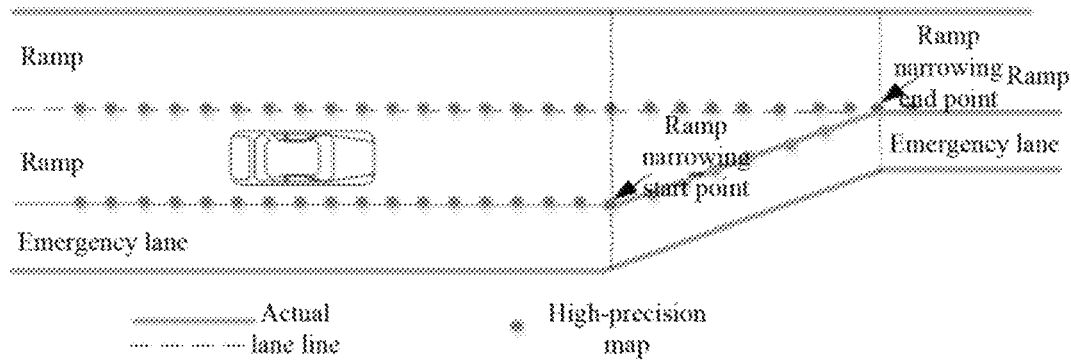
FIG. 9 is a schematic diagram of extracting ramp narrowing feature points according to an embodiment of the present invention.

FIG. 9 is a schematic diagram of extracting ramp narrowing feature points according to an embodiment of the present invention. It can be seen that the ramp narrowing start point, the ramp narrowing end point and position information of the two points can be finally output to accurately represent the current road scene and realize precise control of the vehicle.

IX. Ramp Merging Feature Points and Ramp Joining Feature Points.

Through step S120, when the exchange area attribute of the current road is none, and the exchange area attribute of the next road is a lane joining entrance or exit, it is determined that the next road comprises a ramp merging lane or a ramp joining lane.

Then through step S130, when it is determined that the next road comprises a ramp merging lane, ramp merging feature points are extracted, and a ramp merging start point and a ramp merging end point which belong to the ramp merging feature points, and a relative position from the ramp merging start point and the ramp merging end point to the vehicle are output; or when it is determined that the next road comprises a ramp joining lane, ramp joining feature points are extracted, and a ramp joining start point and a ramp joining end point which belong to the ramp joining feature points, and a relative position from the ramp joining start point and the ramp joining end point to the vehicle are output.

Furthermore, there can be no trigger condition for extracting the ramp merging feature points and the ramp joining feature points, but the road type is comprehensively determined directly through step S120, and then the ramp merging feature points and the ramp joining feature points are extracted through step S130.

Figure 10:
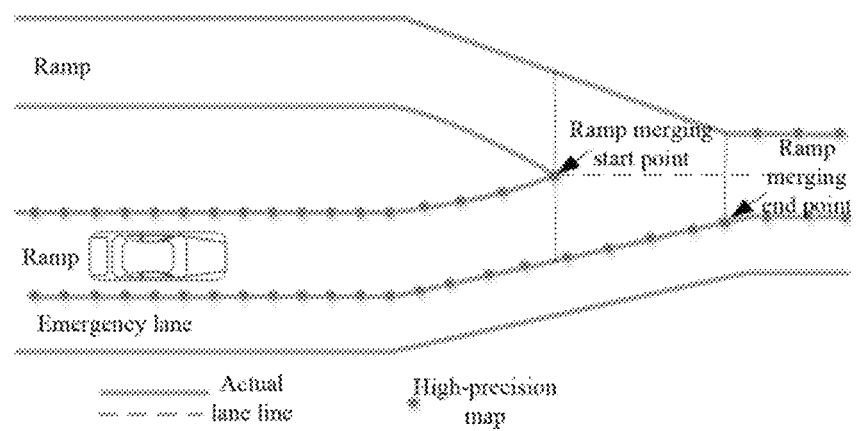
FIG. 10 is a schematic diagram of extracting ramp merging feature points according to an embodiment of the present invention.

FIG. 10 is a schematic diagram of extracting ramp merging feature points according to an embodiment of the present invention. It can be seen that the ramp merging start point, the ramp merging end point and position information of the two points can be finally output to accurately represent the current road scene and realize precise control of the vehicle.

Figure 11:
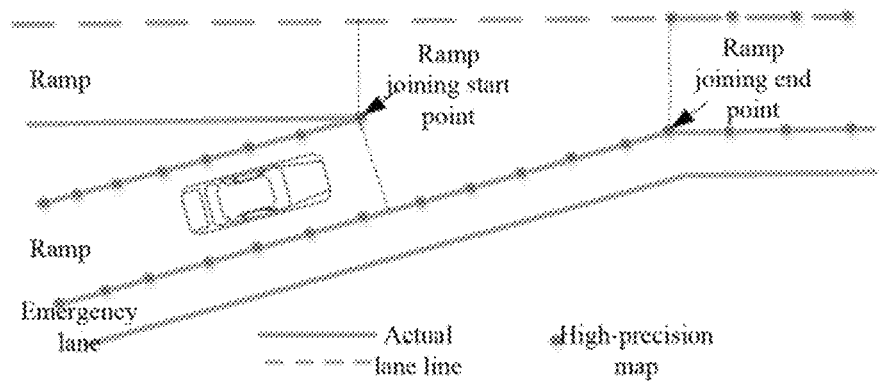
FIG. 11 is a schematic diagram of extracting ramp joining feature points according to an embodiment of the present invention.

FIG. 11 is a schematic diagram of extracting ramp joining feature points according to an embodiment of the present invention. It can be seen that the ramp joining start point, the ramp joining end point and position information of the two points can be finally output to accurately represent the current road scene and realize precise control of the vehicle.

X. Tunnel Feature Points.

Through step S120, when the tunnel attribute of the current road is none, and the tunnel attribute of the next road is present, it is determined that the next road comprises a road tunnel.

Then through step S130, when it is determined that the next road comprises a road tunnel, tunnel feature points are extracted, and a tunnel start point and a tunnel end point which belong to the tunnel feature points, and a relative position from the tunnel start point and the tunnel end point to the vehicle are output.

Furthermore, the navigation information prompting a tunnel ahead (at this time about 2 km from the ramp exit) can be used as a trigger condition for extracting tunnel feature points, and then the tunnel feature points are extracted through step S120 and step S130.

Figure 12:
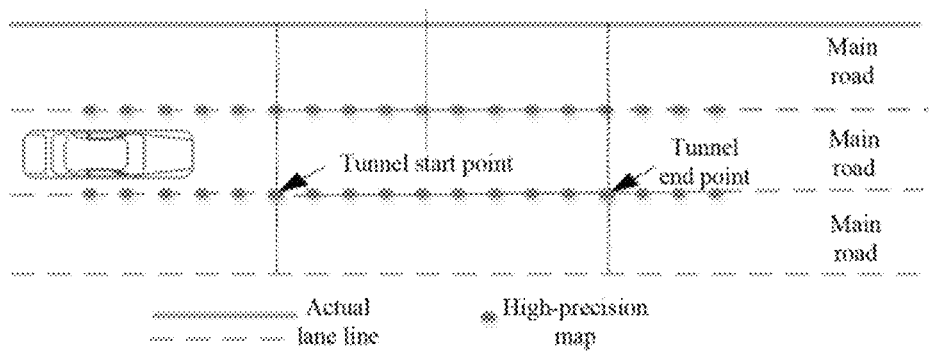
FIG. 12 is a schematic diagram of extracting tunnel feature points according to an embodiment of the present invention.

FIG. 12 is a schematic diagram of extracting tunnel feature points according to an embodiment of the present invention. It can be seen that the tunnel start point, the tunnel end point and position information of the two points can be finally output to accurately represent the current road scene and realize precise control of the vehicle.

It should be noted that for the above-mentioned ten example of extracting feature points, the implementation details of each other can be referred to each other, so that the details of the above-mentioned comprehensible ten feature point extraction solutions that can be implemented in common are not repeated. For example, in the extraction of the above-mentioned ten feature points, navigation information can be used to name the road feature points and the driving coordinate system can be used for position representation.

In summary, the road feature point extraction method according to the embodiments of the present invention does not need to acquire general road information in the vicinity of the current position of the vehicle separately, but determines the road feature point capable of precisely representing the road scene through map information, and extracts the name and position information of the important road feature point related to vehicle control, thereby reducing the data analysis amount for vehicle control and being more targeted, and being capable of extracting the information really needed for vehicle control, and being capable of controlling the vehicle precisely to achieve operations such as acceleration, deceleration and lane changing. In addition, outputting the name of the important road feature point is conducive to simplifying the data format for transmission, and the application of navigation information and map information form redundancy and coordination, which can better ensure the accuracy of extracting the road feature point.

Figure 13:
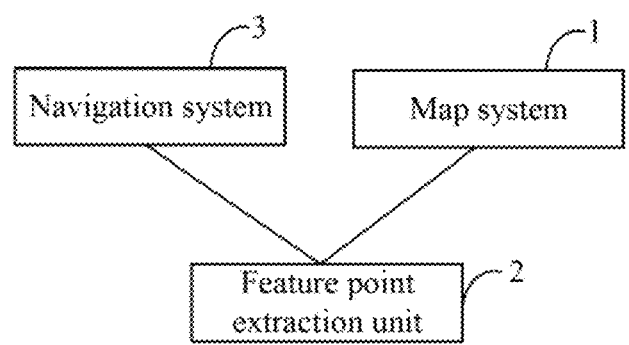
FIG. 13 is a structural schematic diagram of a road feature point extraction system according to another embodiment of the present invention.

FIG. 13 is a structural schematic diagram of a road feature point extraction system according to another embodiment of the present invention, which is based on the same inventive idea as the to above-mentioned embodiment of the road feature point extraction method. As shown in FIG. 13, the road feature point extraction system comprises: a map system 1, installed on a vehicle and used for acquiring map information for a current position of the vehicle, wherein the map information comprises current road attributes and next road attributes; and a feature point extraction unit 2, electrically connected to the map system 1 and used for comparing the current road attributes with the next road attributes to determine a road type of a next road, and extracting a road feature point representing a road scene on the next road by combining the road type of the next road and the map information corresponding to the next road, and outputting a name of the extracted road feature point and relative distance information between the road feature point and the vehicle.

In a preferred embodiment, the road feature point extraction system further comprises: a navigation system 3, installed on the vehicle and used for acquiring navigation information for the current position of the vehicle. The feature point extraction unit 2 is further electrically connected to the navigation system, and used for triggering execution of comparing the current road attributes with the next road attributes by means of forward road conditions prompted by the navigation information.

In a more preferred embodiment, the feature point extraction unit 2 is further used for determining the name of the extracted road feature point by combining the navigation information.

The current road attributes and the next road attributes comprise respective corresponding exchange area attribute, lane line attribute and/or tunnel attribute, wherein the exchange area attribute is information indicating whether there is a change in the number of lanes on the road, the lane line attribute is information indicating the number of lane lines of the road, and the tunnel attribute is information indicating whether there is a tunnel in the road.

Accordingly, the feature point extraction unit 2 comparing the current road attributes with the next road attributes to determine a road type of a next road comprises any one of: determining that the next road comprises an acceleration lane when the exchange area attribute of the current road is none, and the exchange area attribute of the next road is a lane exit or entrance; determining that the next road comprises a deceleration lane when the exchange area attribute of the current road is none, and the exchange area attribute of the next road is an off-ramp; determining that the next road comprises a main road widening lane when the lane number attribute of the current road is less than the lane number attribute of the next road, and the exchange area attribute of the next road is a main road lane increase; determining that the next road comprises a main road narrowing lane when the lane number attribute of the current road is more than the lane number attribute of the next road, and the exchange area attribute of the next road is a main road lane decrease; determining that the next road comprises a main road bifurcation lane when the exchange area attribute of the current road is none, and the exchange area attribute of the next road is a main road lane joining entrance or exit; determining that the next road comprises a ramp bifurcation lane when the exchange area attribute of the current road is none, and the exchange area attribute of the next road is a ramp lane joining entrance or exit; determining that the next road comprises a ramp widening lane when the lane number attribute of the current road is less than the lane number attribute of the next road, and the exchange area attribute of the next road is a ramp lane increase; determining that the next road comprises a ramp narrowing lane when the lane number attribute of the current road is more than the lane number attribute of the next road, and the exchange area attribute of the next road is a ramp lane decrease; determining that the next road comprises a ramp merging lane or a ramp joining lane when the exchange area attribute of the current road is none, and the exchange area attribute of the next road is a lane joining entrance or exit; and determining that the next road comprises a road tunnel when the tunnel attribute of the current road is none, and the tunnel attribute of the next road is present.

The feature point extraction unit 2 extracting a road feature point on the next road, and outputting a name of the extracted road feature point and relative distance information between the road feature point and the vehicle comprises: extracting a corresponding lane feature point when it is determined that the next road comprises any one of an acceleration lane, a deceleration lane, a main road widening lane, a main road narrowing lane, a main road bifurcation lane, a ramp bifurcation lane, a ramp widening lane, a ramp narrowing lane, a ramp merging lane, a ramp joining lane and a tunnel, and outputting a lane start point and a lane end point corresponding to the lane feature point, and a relative position from the lane start point and the lane end point to the vehicle.

It should be noted that other implementation details and effects of the road feature point extraction system in the embodiments of the present invention can refer to the above-mentioned embodiments of the road feature point extraction method, which will not be repeated here.

The above descriptions are only the preferred embodiments of the present invention and are not intended to limit the present invention. Any modification, equivalent replacement, improvement, etc., made within the spirit and principle of the present invention, such as adaptively changing the order of execution of steps and adjusting the connection relationship between functional modules, shall be included in the protection scope of the present invention.

A person skilled in the art can understand that all or part of the steps in the method of the foregoing embodiments can be implemented by a program instructing related hardware. The program is stored in a storage medium, and comprises several instructions for causing a single chip computer, a chip, or a processor to execute all or part of the steps of the method described in each embodiment of the present application. In addition, the aforementioned storage medium comprises various kinds of mediums that may store program codes, such as a U disk, a mobile hard disk, a Read-Only Memory (ROM), a Random Access Memory (RAM), a magnetic disk or an optical disk.

In addition, any combination of the various embodiments of the present invention may be made therebetween, which, as long as not violating the idea of the embodiments of the present invention, shall likewise be considered as contents disclosed in the embodiments of the present invention.

The invention claimed is:

1. A road feature point extraction method, wherein the method comprises:

acquiring map information for a current position of a vehicle, wherein the map information comprises road attributes of a current road and road attributes of a next road, wherein each of the road attributes of the current road and the road attributes of the next road comprise a corresponding exchange area attribute, lane line attribute and/or tunnel attribute, wherein the exchange area attribute is information indicating whether there is a change in a number of lanes on the corresponding road, the lane line attribute is information indicating a number of lane lines of the corresponding road, and the tunnel attribute is information indicating whether there is a tunnel in the corresponding road;

comparing, by a processor, the road attributes of the current road with the road attributes of the next road to determine a road type of the next road;

extracting a road feature point representing a road scene on the next road by combining the road type of the next road and map information corresponding to the next road, wherein the extracting comprises: extracting corresponding lane feature points when it is determined that the next road comprises any one of an acceleration lane, a deceleration lane, a main road widening lane, a main road narrowing lane, a main road bifurcation lane, a ramp bifurcation lane, a ramp widening lane, a ramp narrowing lane, a ramp merging lane, a ramp joining lane and a road tunnel;

outputting a name of the extracted road feature point and relative distance information between the road feature point and the vehicle, wherein the outputting the name of the extracted road feature point comprises: outputting a lane start point and a lane end point both corresponding to the lane feature points, and wherein the outputting the relative distance information comprises: outputting a relative position from each of the lane start point and the lane end point to the vehicle; and controlling, by the processor, the vehicle to perform specific operations based on the outputted name of the extracted road feature point and the outputted relative distance information, wherein the specific operations include acceleration, deceleration and lane changing.

2. The road feature point extraction method according to claim 1, wherein the method further comprises:

acquiring navigation information for the current position of the vehicle; and triggering execution of the comparing the road attributes of the current road with the road attributes of the next road by means of forward road conditions prompted by the navigation information before the comparing the road attributes of the current road with the road attributes of the next road to determine the road type of the next road.

3. The road feature point extraction method according to claim 2, wherein the outputting the name of the extracted road feature point further comprises: determining and outputting the name of the extracted road feature point in combination with the navigation information.

4. The road feature point extraction method according to claim 1, wherein the comparing the road attributes of the current road with the road attributes of the next road to determine the road type of the next road comprises any one of:

determining that the next road comprises the acceleration lane when the exchange area attribute of the current road is none, and the exchange area attribute of the next road is a lane exit or entrance;

determining that the next road comprises the deceleration lane when the exchange area attribute of the current road is none, and the exchange area attribute of the next road is an off-ramp;

determining that the next road comprises the main road widening lane when the lane line attribute of the current road is less than the lane line attribute of the next road, and the exchange area attribute of the next road is a main road lane increase;

determining that the next road comprises the main road narrowing lane when the lane line attribute of the current road is more than the lane line attribute of the next road, and the exchange area attribute of the next road is a main road lane decrease;

determining that the next road comprises the main road bifurcation lane when the exchange area attribute of the current road is none, and the exchange area attribute of the next road is a main road lane joining entrance or exit;

determining that the next road comprises the ramp bifurcation lane when the exchange area attribute of the current road is none, and the exchange area attribute of the next road is a ramp lane joining entrance or exit;

determining that the next road comprises the ramp widening lane when the lane line attribute of the current road is less than the lane line attribute of the next road, and the exchange area attribute of the next road is a ramp lane increase;

determining that the next road comprises the ramp narrowing lane when the lane line attribute of the current road is more than the lane line attribute of the next road, and the exchange area attribute of the next road is a ramp lane decrease;

determining that the next road comprises the ramp merging lane or the ramp joining lane when the exchange area attribute of the current road is none, and the exchange area attribute of the next road is a lane joining entrance or exit; and determining that the next road comprises the road tunnel when the tunnel attribute of the current road is none, and the tunnel attribute of the next road is present.

5. A road feature point extraction system, wherein the system comprises:
a machine-readable medium, wherein the machine-readable medium stores programs that can be executed by the processor; and
the processor, wherein the processor implements the road feature point extraction method according to claim 1 when executing the programs.

6. A non-transitory machine-readable storage medium, wherein an instruction is stored on the non-transitory machine-readable storage medium, and the instruction is configured to cause a controller to execute a road feature point extraction method, wherein the method comprises:
acquiring map information for a current position of a vehicle, wherein the map information comprises road attributes of a current road and road attributes of a next road, wherein each of the road attributes of the current road and the road attributes of the next road comprise a corresponding exchange area attribute, lane line attribute and/or tunnel attribute, wherein the exchange area attribute is information indicating whether there is a change in a number of lanes on the corresponding road, the lane line attribute is information indicating a number of lane lines of the corresponding road, and the tunnel attribute is information indicating whether there is a tunnel in the corresponding road;

comparing the road attributes of the current road with the road attributes of the next road to determine a road type of the next road;

extracting a road feature point representing a road scene on the next road by combining the road type of the next road and map information corresponding to the next road, wherein the extracting comprises: extracting corresponding lane feature points when it is determined that the next road comprises any one of an acceleration lane, a deceleration lane, a main road widening lane, a main road narrowing lane, a main road bifurcation lane, a ramp bifurcation lane, a ramp widening lane, a ramp narrowing lane, a ramp merging lane, a ramp joining lane and a road tunnel;

outputting a name of the extracted road feature point and relative distance information between the road feature point and the vehicle, wherein the outputting the name of the extracted road feature point comprises: outputting a lane start point and a lane end point both corresponding to the lane feature points, and wherein the outputting the relative distance information comprises: outputting a relative position from each of the lane start point and the lane end point to the vehicle; and controlling the vehicle to perform specific operations based on the outputted name of the extracted road feature point and the outputted relative distance information, wherein the specific operations include acceleration, deceleration and lane changing.

7. The non-transitory machine-readable storage medium according to claim 6, wherein the method further comprises:
acquiring navigation information for the current position of the vehicle; and
triggering execution of the comparing the road attributes of the current road with the road attributes of the next road by means of forward road conditions prompted by the navigation information before the comparing the road attributes of the current road with the road attributes of the next road to determine the road type of the next road.

8. The non-transitory machine-readable storage medium according to claim 7, wherein the outputting the name of the extracted road feature point further comprises: determining and outputting the name of the extracted road feature point in combination with the navigation information.

9. The non-transitory machine-readable storage medium according to claim 6, wherein the comparing the road attributes of the current road with the road attributes of the next road to determine the road type of the next road comprises any one of:

determining that the next road comprises the acceleration lane when the exchange area attribute of the current road is none, and the exchange area attribute of the next road is a lane exit or entrance;

determining that the next road comprises the deceleration lane when the exchange area attribute of the current road is none, and the exchange area attribute of the next road is an off-ramp;

determining that the next road comprises the main road widening lane when the lane line attribute of the current road is less than the lane line attribute of the next road, and the exchange area attribute of the next road is a main road lane increase;

determining that the next road comprises the main road narrowing lane when the lane line attribute of the current road is more than the lane line attribute of the next road, and the exchange area attribute of the next road is a main road lane decrease;

determining that the next road comprises the main road bifurcation lane when the exchange area attribute of the current road is none, and the exchange area attribute of the next road is a main road lane joining entrance or exit;

determining that the next road comprises the ramp bifurcation lane when the exchange area attribute of the current road is none, and the exchange area attribute of the next road is a ramp lane joining entrance or exit;

determining that the next road comprises the ramp widening lane when the lane line attribute of the current road is less than the lane line attribute of the next road, and the exchange area attribute of the next road is a ramp lane increase;

determining that the next road comprises the ramp narrowing lane when the lane line attribute of the current road is more than the lane line attribute of the next road, and the exchange area attribute of the next road is a ramp lane decrease;

determining that the next road comprises the ramp merging lane or the ramp joining lane when the exchange area attribute of the current road is none, and the exchange area attribute of the next road is a lane joining entrance or exit; and determining that the next road comprises the road tunnel when the tunnel attribute of the current road is none, and the tunnel attribute of the next road is present.

* * * * *